United States Patent [19]

Wilson

[11] 4,321,969
[45] Mar. 30, 1982

[54] GARDEN CULTIVATOR WITH REVERSING OPERATION ACTIVATED BY VERTICAL ENGINE MOVEMENT AND WITH FREELY ROTATABLE CULTIVATOR CYLINDER

[76] Inventor: Everett E. Wilson, 2822 W. Ironwood Dr., Traverse City, Mich. 49684

[21] Appl. No.: 209,333

[22] Filed: Nov. 24, 1980

[51] Int. Cl.³ .................. B62D 51/04; A01B 29/04; A01B 33/04
[52] U.S. Cl. .......................... 172/42; 74/849; 172/68; 172/536; 180/19 H; 474/4
[58] Field of Search .......... 172/21, 42, 43, 68, 172/125, 292, 536; 180/19 R, 19 S, 19 H; 74/848, 849; 474/4, 5

[56] References Cited

U.S. PATENT DOCUMENTS

| | | | |
|---|---|---|---|
| 2,256,583 | 9/1941 | Squires | 180/19 R UX |
| 2,400,204 | 5/1946 | Lindskog | 172/21 |
| 2,445,797 | 7/1948 | Moore | 180/19 R |
| 2,525,545 | 10/1950 | Hanson | 172/536 |
| 2,572,109 | 10/1951 | Coates | 180/19 R |
| 2,583,272 | 1/1952 | Metzler | 474/5 |
| 2,695,486 | 11/1954 | Hospe | 180/19 R X |
| 2,815,083 | 12/1957 | Ellingsworth | 180/19 H |
| 3,140,677 | 7/1964 | Fraser | 172/42 X |

*Primary Examiner*—Richard T. Stouffer
*Attorney, Agent, or Firm*—Dolgorukov & Dolgorukov

[57] ABSTRACT

The specification discloses an improved garden tiller which, in addition to having power driven rotating tines on the front of the tiller transverse to the direction of travel, has a pair of free wheeling cultivator cylinders mounted to a stationary axle between the normal rear support wheels of the cultivator. The rear wheels can either be manually or power driven, and the forward motion of the machine turns the cylinders, on which radially extending vanes are mounted, to lift up the soil as they roll, and then release it, leaving little furrows in the soil which are good for planting and also keep the soil from drifting in the wind.

17 Claims, 9 Drawing Figures

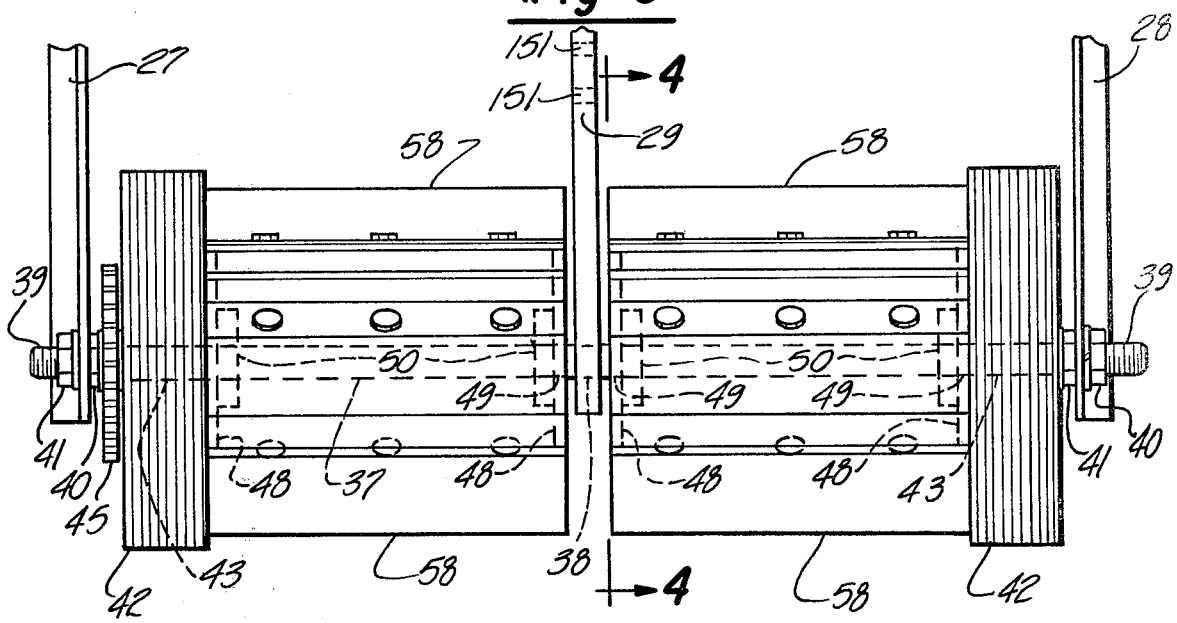
Fig-3
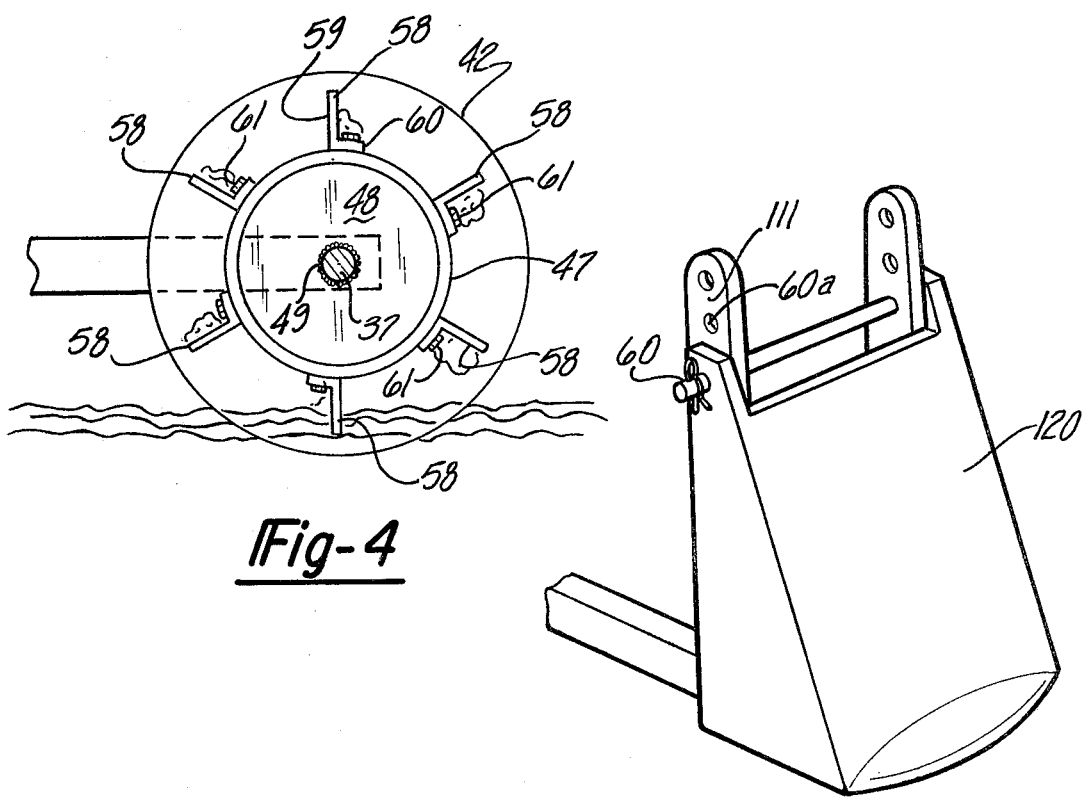
Fig-4
Fig-5

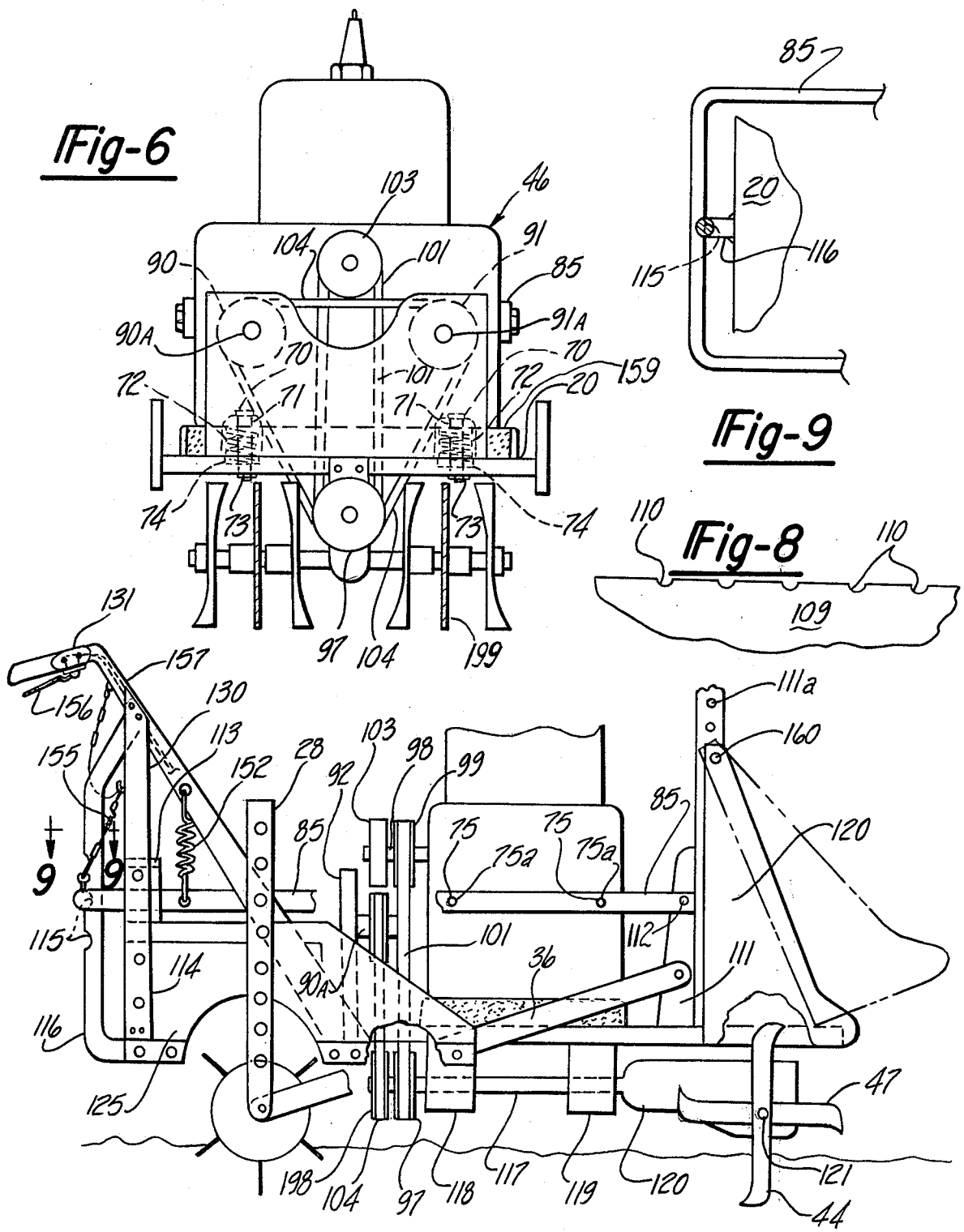

GARDEN CULTIVATOR WITH REVERSING OPERATION ACTIVATED BY VERTICAL ENGINE MOVEMENT AND WITH FREELY ROTATABLE CULTIVATOR CYLINDER

The present invention concerns devices for cultivating the soil, and more particularly concerns an improved garden cultivator which has, in addition to the normal rotatable tines mounted on an axle transverse to the direction of travel, and rear supporting wheels, a pair of cylinders mounted between said rear supporting wheels on an axle, and being individually rotatable thereon to pick up and gently repack the tilled soil at the same time they act as a supporting means for the tiller.

As one familiar with the cultivator art, I am aware of the fact that many soil cultivators are available, all of which have the same purpose of raking up and turning over the soil. However, while all of them more or less satisfactorily perform such functions, they do not attack problems which result from the use of such cultivator which have been long standing in the art.

One of such problems concerns the fact that if it is at all windy after the soil is tilled, the soil is left in a very loose condition by the cultivator and readily blows away in the wind. It has been generally thought in the art that any attempt to solve this problem must involve a repacking of the soil which would undue most of the aerating which has been done by the cultivator. As will be explained later, however, I have found that a very light repacking of only the topmost layer of the soil leaves the soil immediately below the surface substantially in the same aerated condition it would be with the tilling alone, and this slight repacking prevents the soil from blowing away.

Also, it is common practice before loosening up the soil to put a mulch down on the surface with the hopes that the mulch will be mixed in the soil by the rotating tines of the cultivator and, therefore, provide a more suitable soil for planting. However, I have found that the conventional cultivator just does not do a good job of mixing this mulch, and most of it will blow away at the first opportunity.

Also, the conventional cultivator leaves the soil in a condition wherein furrows for seeds must be placed in the soil after the tilling operation. As will be shown below, I have, along with the solving of the problems of mixing in mulch and preventing soil from blowing in the wind, provided a ground surface which, after tilling with my improved garden cultivator, has a plurality of spaced furrows in the surface which may be used for planting seeds directly, or, if not in the exact position the user wants, at least provide a surface in which they can be more easily provided.

Thus, one of the objects of the present invention is to provide an improved garden cultivator which aerates the soil through a conventional cultivating operation and then slightly repacks the top surface of the soil to prevent the soil from blowing away.

Another object of the present invention is to provide an improved garden cultivator which has conventional rotating tines at the front thereof, and at least one free wheeling cylinder with radially extending vanes mounted between the rear support wheels thereof to lift up the cultivated soil and gently pack it back down to provide soil which is aerated below the surface for a substantial distance, but which has the top surface thereof gently packed.

Another object of the present invention is to provide a garden cultivator adapted to cover substantially any mulch placed on the ground before tilling.

Another object of the present invention is to provide an improved garden cultivator of the foregoing nature which leaves a plurality of short parallel furrows after cultivating the soil which may have seeds or the like readily planted therein.

Another object of the present invention is to provide an improved garden cultivator of the type having rotatable tines or other devices mounted in planes parallel to the direction of travel which are easily reversed by a reversible belt drive transmission system which transmits power from the engine to a transmission adapted to rotate the tines.

A still further object of the present invention is to have a belt drive of the foregoing nature adapted to have the cultivator travel in a forward direction when power is transmitted through a forward drive belt, and to have the cultivator travel in a reverse direction when the forward drive belt is disengaged, and wherein the reverse drive belt is engaged by the same shaft carrying the forward drive belt, but acting on a separate reverse drive belt.

A still further object of the present invention is to have the reversing operation occur by having the gasoline or other type motor operating the cultivator being movable a short distance in a vertical direction by virtue of being spring mounted on the frame of the cultivator.

Another object of the present invention is to provide an improved garden cultivator which is simple in nature and relatively inexpensive to manufacture.

Another object of the present invention is to provide a garden cultivator wherein a shield may be placed in front of the rotating tines to substantially encase them from the front and sides.

Further objects and advantages of my invention will be apparent from the following description and appended claims, reference being had to the accompanying drawings forming a part of the specification, wherein like reference characters designate corresponding parts in the several views.

FIG. 3 is a cut-away view showing the rear support wheels of the cultivator construction shown in FIG. 2 having a stationary axle mounted therebetween, and a pair of cultivator cylinders with radially extending vanes mounted thereon.

FIG. 4 is a sectional view taken in the direction of the arrows along the section line 4—4 of FIG. 3.

FIG. 5 is a perspective view of the shield shown in FIG. 7, which encases the rotating tines of the tiller from the front and sides.

FIG. 6 is a rear elevational view of a reversible drive mechanism for a garden cultivator embodying my invention.

FIG. 7 is an elevational view of the construction shown in FIG. 6, and in addition shows in greater detail the handle used for moving the engine on a spring mount in a vertical direction, as well as optional guards for the tines and rotating cylinders.

FIG. 8 is a cut-away sectional view of a portion of a piece of ground after it has been cultivated by my improved garden cultivator.

FIG. 9 is a sectional view taken in the direction of the arrows along the section line 9—9 of FIG. 7.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

Figure 1:
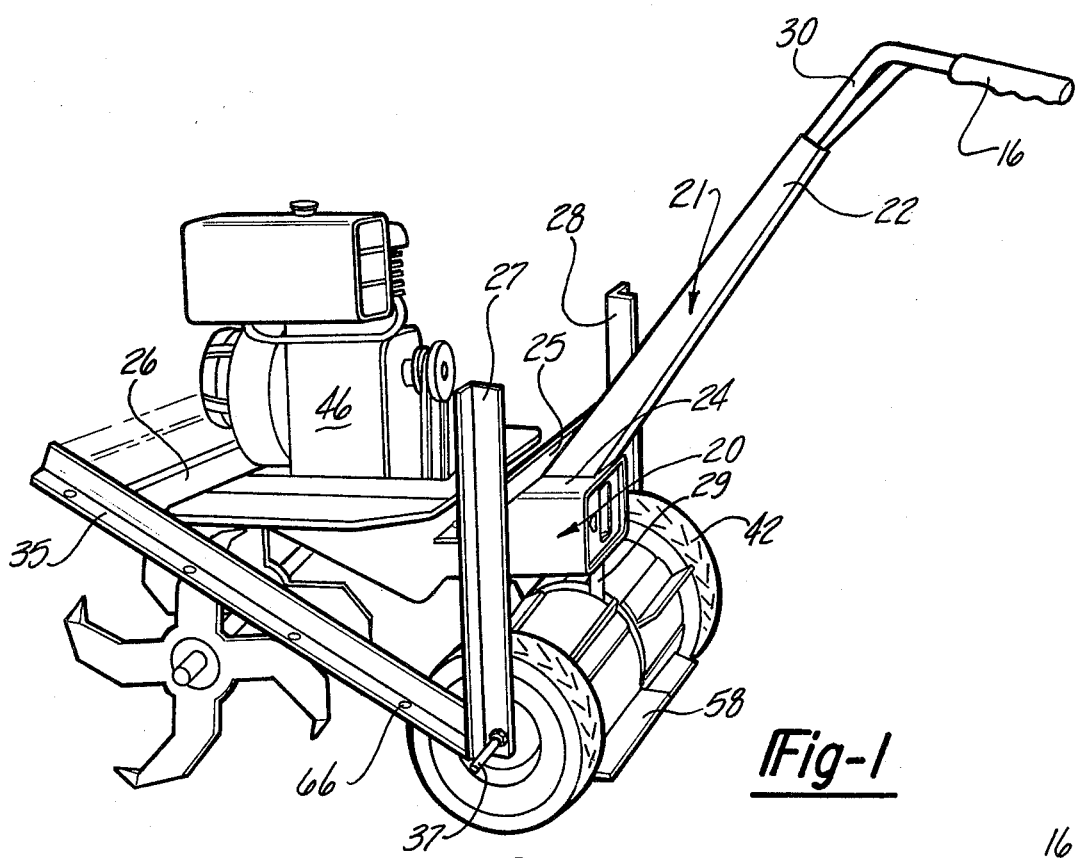
FIG. 1 is a perspective view of a tiller construction embodying the present invention taken in a substantially sidewardly direction.
Figure 2:
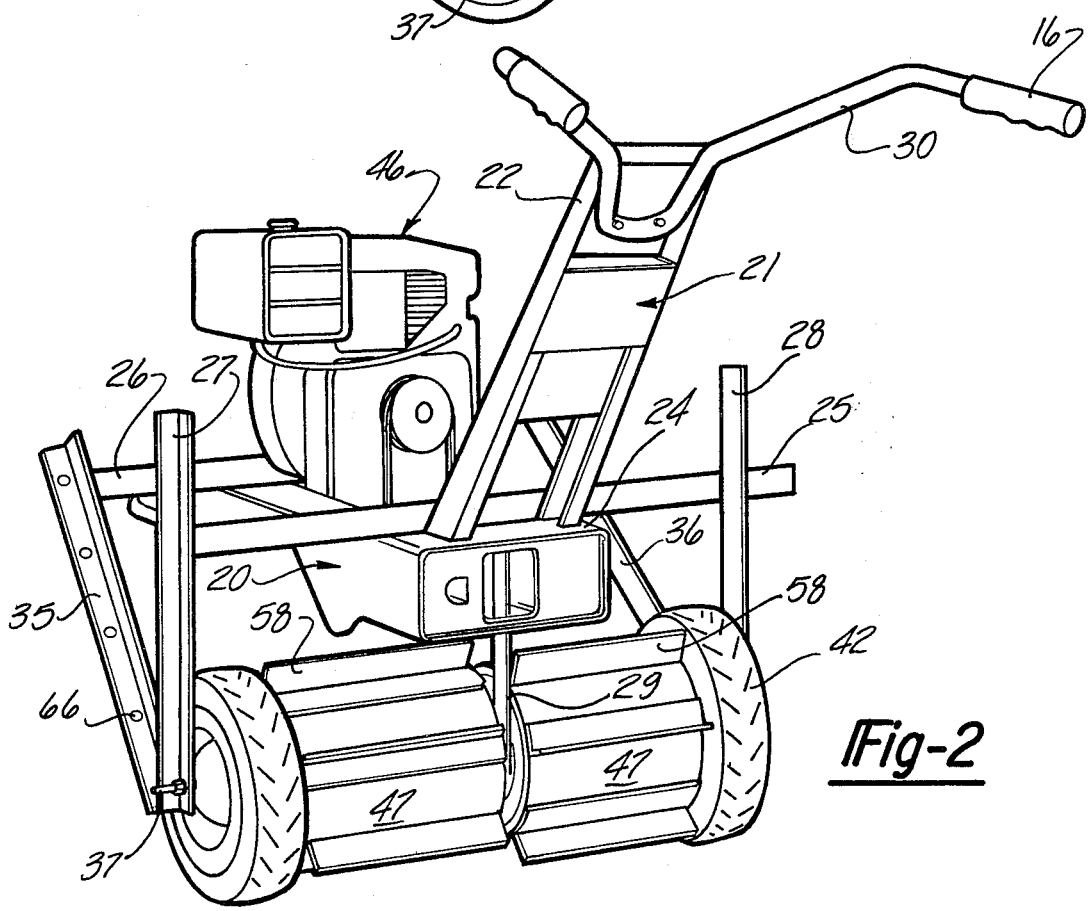
FIG. 2 is a perspective view of a construction embodying my invention taken substantially at the rear of the cultivator.

Referring to FIGS. 1 and 2, the construction of my improved cultivator is relatively simple. A tubular frame member generally designated by the numeral 20 is provided as the basic supporting frame for my device. An upwardly extending handle assembly, generally designated by the numeral 21, is attached to the rear of the frame member 20, and at the upper end 22 of the handle assembly 21 is attached a handlebar type means 30 for the operator to grasp the device while operating it, such handlebar means may be stationary as shown in FIG. 1, or adjustable as shown in FIG. 7. It is, of course, to be understood that other types and shapes of devices are available and a handlebar is used just for the purposes of illustration. At the ends of the handlebars are placed grips 16.

On the top surface 24 of the tubular frame member 20 is fastened by any suitable means a rear horizontal brace 25 perpendicular to the axis of the frame member 20. Similarly at the front of the tubular frame member on the top surface 24 is attached a front horizontal brace 26. Near each end of the rear horizontal brace 25 there is attached a first vertical brace 27 and at the other end in the same vertical plane is attached a second vertical brace 28. Also in the same plane as the second vertical brace 28 is a center brace 29 attached at its top to the tubular frame member 20, and utilized at its bottom end in a manner to be described.

To each end of the front horizontal braces 26 is attached a first angle brace 35 and a second angle brace 36. The first angle brace 35 is attached by any suitable means to the one end of the front horizontal brace 36, and at its other end to the lower end of the first vertical brace 27, while the second angle brace 36 is attached to the other end of the front horizontal brace 26 at its upper end, and at its lower end is attached to the second vertical brace 28.

Referring now to FIG. 3, it can be seen that by virtue of this arrangement a strong support is provided for the axle 37 which is mounted at its ends to the first and second vertical braces 27 and 28 and passes through the center brace 29 by virtue of the hole 38 provided therein. Adjustment holes 151 are provided in the center brace 29 for adjustment purposes. The ends of the axle 37 are threaded for a predetermined distance, the thread being indicated by the numeral 39. The axle is maintained in a fixed position by virtue of the spacer nuts 40 being threaded onto the ends of the axle for the entire distance of the threads 39 after the axle is placed in position, and then the lock nuts 41 are tightened down. Wheels 42 are rotatably mounted to the axles by having fixedly mounted therein bearings 43 which allow the wheels to rotate about the axle 37.

Thus, it can be seen that as my improved cultivator is propelled in the forward or reverse direction by virtue of the rotating tines 44 of the cultivator, the rear wheels 42 rotate about the axle 37 and allow the forward motion of my improved cultivator to take place. Shown for the purposes of illustration is a sprocket 45 which will allow one to power drive the wheels off the engine 46, if desired. However, it should be understood, of course, that my cultivator works equally well whether the wheels 42 are power driven or not. It should also be understood that, if desired, the wheels 42 can be made integral with the cylinders 47. For example, a rubber thread may just be mounted about an extension of said cylinder. One or more of the tines 44 can be replaced by a saw or a sharp circular disc, graphically illustrated by element 199 in FIG. 6.

As shown in FIG. 4, to accomplish the lifting and replacing of the dirt as previously described, a pair of rotating cylinders is also freely mounted on the axle between the wheels 42 and the center brace 29. It can be seen that each cylinder is of relatively simple construction and comprises a hollow cylinder 47 of predetermined length made of any practicable material such as steel, aluminum, nylon or other material with suitable strength. On each end of the cylinder there is a closure member 48 which may be of any suitable form, and in the preferred embodiment of the invention is just a circular steel plate welded to the ends of the cylinder 47. In this way a closed circular cylinder is provided.

In each closure member 48 an opening 49 is provided to permit passage of the axle 37. Immediately inside each closure member 48 there is mounted a plate bearing 50 adapted to receive the axle 37. When the hollow cylinder 47 is properly constructed, the opening in the plate bearing 50 will line up with the plate opening 49 to allow the axle 37 to pass through the openings without binding. To the outside of the cylinder a plurality of vanes 58 are mounted in a radially extending direction. The vanes consist of an upstanding portion 59 and a mounting portion 60. The vanes may be attached to the cylinder in any practicable fashion as long as each vane is mounted so that its upstanding portion 59 is substantially in a plane which intercepts the axle 37. In this illustration of the invention, simple bolts 61 are used to mount the vanes 58 to the cylinder 47.

A unique drive system for my improved cultivator is shown in FIG. 6. A conventional gasoline, diesel, or other type of motive power engine generally designated by the numeral 46 is mounted to the tubular frame 20. However, the mounting used is not a conventional solid mounting, or even a mounting on rubber engine mounts, but is purposely made to be a mount which allows the engine to move a short distance in a vertical direction, say approximately one inch or so. This is accomplished by a spring mounting wherein the mounting bolt 70 is made longer than the usual amount by the necessary amount to allow the engine to move in the vertical direction, and the bolt is passed through the mounting hole 71 after which a spring 72 is placed about the bolt and the bolt is placed through the frame mounting hole 74.

It is to be noted that the bottoms of the springs 72 rest in wells 150 provided in the frame member 20. It is to be understood that although the preferred embodiment uses such wells, many ways of mounting the engine for vertical movement are possible, and in some of these the wells 150 may not be required.

The ends of each mounting bolt 70 are threaded for the appropriate distance to allow the nut 73 to be placed thereon in a locking relationship so that it will not come loose during the vibration which is naturally present during the operation of the cultivator. As many mounting bolts are used as necessary to provide an engine mount having the sufficient strength for the particular size cultivator in use.

In place of the springs 74, I have successfully used stiff foam pads 159 (FIG. 6). These pads may be used in place of the springs 74, or as auxiliary support means as shown.

Referring now to FIG. 7, to provide for movement of the engine 46, a handle 85 is pivotally mounted to stubs 75. The stubs 75 protrude through openings 75a slightly larger than said stubs which are provided in handle 85. Such handle is pivotally mounted to a vertical brace 111, which for clarity was not shown in the previous figures, by the bolt and nut assemblies 112. At its other end the handle passes through a guideway 113 attached to a second vertical extension 114 by suitable fastening means 115.

The handle can either be in an upper position, a neutral position, or in a lower position. The movable handle being swivably mounted by the bolt and nut assemblies 112 is held in its upper, neutral, or lower position by the detents 115 in the detent member 116 mounted to the tubular frame member 20 in combination with the spring 152. When the handle is in its upper position the tiller will proceed in its normal forward direction by means of the engine output shaft 98 and the engine pulley 99 transmitting force directly to the worm drive pulley 97 through the first V-belt 101. Such worm drive pulley 97 is fixedly connected to the rotatable worm drive shaft 117 and is held in place by shaft supports 118 and 119. The shaft communicates with a gear case 120 which contains the worm drive pulley 97 which has as its output a shaft 121 on which the tines 44 are mounted. When the handle 85 is in its lowered position, however, the motor pulley 99 is lowered in relation to the tubular frame member 20 into a new position.

In this condition, the engine pulley 99 no longer drives the belt 101, and the reverse pulley 103 comes into contact with second V-belt 104 which traverses a second reversing pulley 198 mounted to the same drive shaft 117 on its outer end and it also traverses a first idler pulley and a second idler pulley 90 and 91 respectively, mounted on first and second stub shafts 90a and 91a respectively, which are, in turn, affixed to the mounting plate 92.

It can easily be seen that when the motor pulley 99 is lowered, the reverse pulley 103 comes into contact with the second V-belt 104 and drives the worm drive shaft 117 in a reverse direction from that in which it was driven before, thus, reversing the direction of the tines 44.

This solves a long standing problem in the art because as anyone knows who often uses a device of the present type, the tines 44 have a tendency to dig into the ground on occasion while the cultivator is in forward motion, and if this condition is not quickly corrected, if the engine is powerful enough, the cultivator will dig itself in quite deeply, making its removal difficult, or, if the engine is not of a powerful type, the engine will stall. In both cases freeing the cultivator is quite a chore, and I have now provided simple means to easily and quickly reverse the direction of the tines so that the cultivator will be able to be backed out easily by virtue of the counterclockwise rotation of the tines 44.

Safety means are provided for the safety of the operator. A safety chain 155 is provided between the handle 85 and the vertical support 114 which must be unhooked before lever 85 can be put into reverse position by being placed into the lowermost detent 116. Also, a safety switch 156 is provided which is connected to the engine 46 by wire 157 in such a way that if it is released, say by the operator taking both hands off the handle 85, the engine will be grounded out and stop.

Referring to FIGS. 5 and 9 there may be provided a shielding device 120 which takes somewhat the form of a railroad cow catcher. Such device is pivotally mounted by bolt and nut assembly 160 to the support 111 previously discussed. Holes 111a accept the assembly 160.

Referring again to FIG. 7, the additional vertical support 114 which holds the guideway 113 has already been discussed above. This guideway, of course, could have been put on the first and second vertical supports 28 if desired, but I have shown it in my modified version of the cultivator as placed on the additional vertical supports 114 which are attached to an extended frame 20 to hold a rear shield 125 which covers the vanes on the circular cylinders 47, as well as covering the driven pulley 97 and 98 and their associated V-belts 101 and 104. Also shown in an additional handle brace 130 which may be used, if desired, together with the adjusting means 131 for the handlebar 23 previously discussed.

It should be understood, of course, that any other position such as an intermediate position may be provided for the handle 85 in the manner just described. Also, it is well within the scope of the present invention that many types of pulleys and/or V-belts or the like may be used for the purpose of transmitting power through my reversing drive and be well within the scope of the present invention.

Referring to FIG. 8, a diagrammatic view of a piece of earth which has been tilled by my improved garden cultivator is shown. The earth is represented by numeral 109 and, as described above, the furrows 110 are produced by the gentle lifting up and placing and patting down of the ground. These furrows 110 may already be suitable for planting certain types of seed, and if they are not, they provide a good basis for providing suitable furrows with very little additional work.

Thus, by providing an improved garden cultivator with a quick and inexpensive reversing means, and a pair of cylinders having radially extending vanes mounted between the conventional rear wheels of such cultivator, I have provided a new and improved garden cultivator which has solved many of the problems long standing in the art.

I claim:

1. An improved garden cultivator comprising a tubular frame member, a handle assembly mounted thereto, and an engine having an output shaft mounted on said tubular frame in a manner to allow it limited movement in a vertical direction, reversing means activated as desired by said vertical movement, a worm drive having an output shaft drivingly connected to said engine, said worm drive output shaft adapted to be reversed by said reversing means, a plurality of tines mounted on said worm drive output shaft, an axle holding means mounted to said tubular frame member, an axle fixedly mounted to said axle holding means, a pair of wheels mounted to said axle, and at least one cultivator cylinder interposed between said wheels, said cylinder freely rotatable about said axle and having a plurality of radially extending vanes mounted thereto.

2. The device defined in claim 1, wherein said reversing means includes an engine pulley and a first reversing pulley fixedly mounted to said engine output shaft, a worm drive shaft connected to said worm drive, a driven pulley and a second reversing pulley mounted to said worm drive shaft in alignment with said engine pulley and said reversing pulley, and adapted when said engine is moved in a downwardly vertical direction to have said first reversing pulley come into contact with a second V-belt, said second V-belt traversing a first idler pulley and a second idler pulley, a vertical mounting plate fixedly mounted to said tubular frame member, a first stub shaft and a second stub shaft mounted to said mounting plate, and said first idler pulley mounted to said first stub shaft, and said second idler pulley rotatably mounted to said second stub shaft.

3. The device defined in claim 2, wherein said limited vertical movement of said engine is provided by a spring mounting means for said engine.

4. The device defined in claim 3, wherein said spring mounting means include a plurality of mounting holes provided in said engine, a plurality of frame mounting holes provided in said tubular frame member, a plurality of springs of a predetermined length, a plurality of mounting bolts of a predetermined length greater than said predetermined length of said springs, such that when said mounting bolts are passed through said engine mounting holes and said frame mounting holes and said spring and tightened onto said nuts, said engine in its uppermost position will be held a desired distance off said tubular frame.

5. The device defined in claim 4, wherein said axle holding means includes a rear horizontal brace mounted transversely to the axis of said tubular frame member at the rear thereof, a front horizontal brace mounted transversely to the axis of said tubular frame member at the front thereof, a first vertical brace mounted at one extremity of said rear horizontal brace and a second vertical brace mounted near the other extremity of said rear horizontal brace and extending above and below said rear brace for a predetermined distance, a first angle brace mounted near one of its extremities to said front horizontal brace and at its other extremity to the lower end of said first vertical brace, a second angle brace mounted near one of its extremities to the other end of said front horizontal brace and at its other extremity to the other end of said second vertical brace, a hole provided at the lower end of said first vertical brace and said second vertical brace, all adapted to fixedly hold said axle therebetween.

6. The device defined in claim 5, wherein said cultivator cylinder includes a hollow right-circular cylinder of suitable materials, a closure member mounted at each end of said right-circular hollow cylinder, a plate opening provided in each closure member of a suitable diameter to allow said axle to pass therethrough, and a plate bearing mounted to each of said closure members about said plate opening to accept said axle and allow said cultivator cylinder to freely rotate about said axle, said plurality of vanes having an upstanding portion and a mounting portion provided about said hollow right-circular cylinder, and a plurality of bolts holding said vanes onto said right-circular hollow cylinder.

7. The device defined in claim 6, and having a pair of said cultivator cylinders and including a center brace 29 mounted at one of its extremities to said tubular frame member, and having a hole 38 provided at the lower extremity therein in line with said holes in said lower extremities of said first and said second vertical braces, and including a pair of cultivator cylinders and a pair of wheels mounted one each between said center brace and said second vertical brace and said center brace and said first vertical brace, said axle including threads of a predetermined length on each extremity thereof, a lock nut provided on said axle at the extremities thereof on said threads, said first and second vertical braces placed against said lock nuts on either end of said axle, said lock nuts being provided on said threads at each end of said axle to fixedly and nonrotatably hold said axle in place between said second and said first vertical braces.

8. The device defined in any one of claims 6 or 7, wherein a sprocket gear is fixedly mounted to said axle to be driven by said engine and thereby power said wheels.

9. The device defined in claim 7, and including a shielding device adapted to be pivotally mounted on said cultivator in such a way as to shield the tines mounted on said worm drive output shaft.

10. The device defined in claim 9, wherein said reversing means further includes a further vertical brace mounted to the forward end of said frame member, in addition to said handle assembly, a handle pivotally mounted to said further vertical brace, a plurality of holes adapted to receive pins provided in said handle, a plurality of pins mounted on said engine and extending into said pin holes, a guideway constraining the movement of said handle to a predetermined amount in the vertical direction, and a spring means to aid in the movement of said handle.

11. The device defined in claim 10, wherein said spring means includes a spring interposed between said handle and said handle assembly.

12. The device defined in claim 11, and including a rear vertical extension of said tubular frame member, said rear vertical extension attached at one end to said tubular frame member and at its other end to said handle assembly, and a rear shield assembly attached to said rear vertical extension and adapted to shield said cultivator assemblies, and having said first and said second angle braces attached to said forward extension.

13. The device defined in claim 11, wherein said worm drive includes a pair of bearing blocks mounted underneath said tubular frame extensions and adapted to hold said worm drive shaft.

14. The device defined in claim 13, wherein one or more of said tines are replaced by a saw.

15. The device defined in claim 13 where one or more of said tines are replaced by a sharp circular disk.

16. The device defined in claim 15, and including safety switch and chain means for the protection of the cultivator operator.

17. The device defined in claim 1, wherein said limited vertical movement of said engine is provided by mounting means for said engine comprising stiff foam pads.

* * * * *